(12) United States Patent
Thomas et al.

(10) Patent No.: US 8,030,594 B2
(45) Date of Patent: Oct. 4, 2011

(54) COLOR SENSING FOR LASER DECOATING

(75) Inventors: James W. Thomas, Los Altos, CA (US); Mitchell R. Wool, Sunnyvale, CA (US)

(73) Assignee: General Lasertronics Corporation, San Jose, CA (US)

( * ) Notice: Subject to any disclaimer, the term of this patent is extended or adjusted under 35 U.S.C. 154(b) by 210 days.

(21) Appl. No.: 12/614,220

(22) Filed: Nov. 6, 2009

(65) Prior Publication Data

US 2010/0044357 A1 Feb. 25, 2010

Related U.S. Application Data

(62) Division of application No. 11/030,710, filed on Jan. 5, 2005, now Pat. No. 7,633,033.

(60) Provisional application No. 60/535,725, filed on Jan. 9, 2004.

(51) Int. Cl.
 *B23K 26/02* (2006.01)
 *B23K 26/04* (2006.01)

(52) U.S. Cl. ............... 219/121.69; 219/121.62; 427/554

(58) Field of Classification Search ............ 219/121.62, 219/121.68, 121.81, 121.83, 121.69; 427/554; 430/19, 945
 See application file for complete search history.

(56) References Cited

U.S. PATENT DOCUMENTS

| | | |
|---|---|---|
| 3,626,141 A | 12/1971 | Daly |
| 3,657,707 A | 4/1972 | McFarland et al. |
| 3,843,865 A | 10/1974 | Nath |
| 3,941,973 A | 3/1976 | Luck, Jr. et al. |
| 4,148,057 A | 4/1979 | Jesse |
| 4,207,874 A | 6/1980 | Choy |
| 4,398,790 A | 8/1983 | Righini et al. |
| 4,449,043 A | 5/1984 | Husbands |
| 4,521,070 A | 6/1985 | Scottini et al. |
| 4,543,477 A | 9/1985 | Doi et al. |
| 4,564,736 A | 1/1986 | Jones et al. |
| 4,566,937 A | 1/1986 | Pitts |
| 4,584,455 A | 4/1986 | Tomizawa |
| 4,588,885 A | 5/1986 | Lovoi et al. |
| 4,654,532 A | 3/1987 | Hirschfeld |
| 4,665,377 A | 5/1987 | Harpaintner |
| 4,671,848 A | 6/1987 | Miller et al. |

(Continued)

FOREIGN PATENT DOCUMENTS

FR 2 661 371 4/1990

(Continued)

OTHER PUBLICATIONS

"Photonic Cleaning Process Moves to Heavy Industry," Mar. 1997, p. 22, Photonics Spectra.

(Continued)

*Primary Examiner* — Samuel M Heinrich
(74) *Attorney, Agent, or Firm* — Haverstock & Owens LLP

(57) ABSTRACT

A coating removal apparatus utilizing a common optics path to provide laser pulses to a coated surface and to direct a light illumination reflected from the coated surface to a photosensitive detector and analyzer. The apparatus is an integrated device including a laser source, a beam splitter, scanning optics, a waste removal apparatus, one or more light illuminators, a photosensitive detector, a comparator, and a control logic circuit. Alternatively, the laser source is external to the integrated device and a fiber optic cable is used to connect the laser source to the integrated device.

22 Claims, 6 Drawing Sheets

U.S. PATENT DOCUMENTS

| | | | |
|---|---|---|---|
| 4,676,586 A | 6/1987 | Jones et al. |
| 4,687,918 A | 8/1987 | Hughes et al. |
| 4,695,698 A | 9/1987 | Mayor et al. |
| 4,707,073 A | 11/1987 | Kocher |
| 4,729,621 A | 3/1988 | Edelman |
| 4,737,004 A | 4/1988 | Amitay et al. |
| 4,737,628 A | 4/1988 | Lovoi |
| 4,749,840 A | 6/1988 | Piwczyk |
| 4,756,765 A | 7/1988 | Woodroffe |
| 4,762,385 A | 8/1988 | Fuse |
| 4,799,755 A | 1/1989 | Jones |
| 4,807,954 A | 2/1989 | Oyamada et al. |
| 4,818,049 A | 4/1989 | Assenheim et al. |
| 4,818,062 A | 4/1989 | Scifres et al. |
| 4,821,943 A | 4/1989 | Gaudin et al. |
| 4,842,360 A | 6/1989 | Caro et al. |
| 4,844,574 A | 7/1989 | Chande |
| 4,844,947 A | 7/1989 | Kasner et al. |
| 4,859,075 A | 8/1989 | Sutter, Jr. et al. |
| 4,876,444 A | 10/1989 | Field |
| 4,880,959 A | 11/1989 | Baum et al. |
| 4,900,891 A | 2/1990 | Vega et al. |
| 4,920,994 A | 5/1990 | Nachbar |
| 4,928,695 A | 5/1990 | Goldman et al. |
| 4,944,567 A | 7/1990 | Kuper et al. |
| 4,960,988 A | 10/1990 | Simms |
| 4,986,664 A | 1/1991 | Lovoi |
| 5,006,268 A | 4/1991 | Griffaton |
| 5,040,479 A | 8/1991 | Thrash |
| 5,068,750 A | 11/1991 | Cook et al. |
| RE33,777 E | 12/1991 | Woodroffe |
| 5,081,350 A | 1/1992 | Iwasaki et al. |
| 5,107,445 A | 4/1992 | Jensen et al. |
| 5,113,802 A | 5/1992 | Le Blanc |
| 5,151,134 A | 9/1992 | Boquillon et al. |
| 5,194,723 A | 3/1993 | Cates et al. |
| 5,229,593 A | 7/1993 | Cato |
| 5,245,682 A | 9/1993 | Ortiz et al. |
| 5,281,798 A | 1/1994 | Hamm et al. |
| 5,291,570 A | 3/1994 | Filgas et al. |
| 5,293,023 A | 3/1994 | Haruta et al. |
| 5,328,517 A | 7/1994 | Cates et al. |
| 5,333,218 A | 7/1994 | Ortiz et al. |
| 5,355,063 A | 10/1994 | Boone et al. |
| 5,364,390 A | 11/1994 | Taboada et al. |
| 5,371,582 A | 12/1994 | Toba et al. |
| 5,373,140 A | 12/1994 | Nagy et al. |
| 5,386,112 A | 1/1995 | Dixon |
| 5,395,362 A | 3/1995 | Sacharoff et al. |
| 5,446,256 A | 8/1995 | Cartry |
| 5,451,765 A | 9/1995 | Gerber |
| 5,531,857 A | 7/1996 | Engelsberg et al. |
| 5,548,113 A | 8/1996 | Goldberg |
| 5,558,666 A | 9/1996 | Dewey et al. |
| 5,581,346 A | 12/1996 | Sopori |
| 5,589,089 A | 12/1996 | Usegi |
| 5,592,879 A | 1/1997 | Waizmann |
| 5,610,753 A | 3/1997 | Kessler et al. |
| 5,613,509 A | 3/1997 | Kolb |
| 5,637,245 A | 6/1997 | Shelton |
| 5,643,476 A | 7/1997 | Garmire et al. |
| 5,662,762 A | 9/1997 | Ranalli |
| 5,780,806 A | 7/1998 | Ferguson et al. |
| 5,784,162 A | 7/1998 | Cabib et al. |
| 5,805,275 A | 9/1998 | Taylor |
| 5,845,646 A | 12/1998 | Lemelson |
| 5,864,114 A | 1/1999 | Fukuda |
| 5,986,234 A | 11/1999 | Matthews et al. |
| 6,165,170 A | 12/2000 | Wynne et al. |
| 6,285,002 B1 | 9/2001 | Ngoi |
| 6,288,362 B1 | 9/2001 | Thomas et al. |
| 6,313,435 B1 | 11/2001 | Shoemaker et al. |
| 6,383,177 B1 | 5/2002 | Balle-Petersen et al. |
| 6,384,370 B1 * | 5/2002 | Tsunemi et al. ......... 219/121.69 |
| 6,414,263 B1 | 7/2002 | Uchida |
| 6,437,285 B1 | 8/2002 | Thomas et al. |
| 6,635,844 B2 | 10/2003 | Yu |
| 6,664,499 B1 | 12/2003 | Brink et al. |
| 6,864,478 B2 | 3/2005 | Schroder |
| 6,924,457 B2 | 8/2005 | Koyama et al. |
| 6,927,917 B2 | 8/2005 | Kimura |
| 7,009,141 B1 | 3/2006 | Wool et al. |
| 7,265,033 B2 | 9/2007 | Shigematsu et al. |
| 7,408,130 B2 | 8/2008 | Sonoda et al. |
| 7,452,476 B2 | 11/2008 | Bayer et al. |
| 7,633,033 B2 | 12/2009 | Thomas et al. |
| 2002/0134770 A1 | 9/2002 | Freiwald et al. |
| 2002/0153361 A1 | 10/2002 | Sakamoto |
| 2004/0045497 A1 | 3/2004 | Kriews et al. |
| 2004/0057047 A1 | 3/2004 | Knebel |
| 2005/0150878 A1 | 7/2005 | Thomas et al. |
| 2006/0186098 A1 | 8/2006 | Caristan |
| 2007/0000885 A1 | 1/2007 | Thomas et al. |
| 2007/0051708 A1 | 3/2007 | Talwar et al. |
| 2007/0224768 A1 | 9/2007 | Chaplick et al. |

FOREIGN PATENT DOCUMENTS

| | | |
|---|---|---|
| FR | 2 689 423 | 4/1990 |
| GB | 2 246 099 A | 1/1992 |
| GB | 2 402 230 B | 12/2004 |
| JP | 01203090 A | 8/1989 |
| JP | 02263854 A | 10/1990 |
| JP | 05082276 A | 4/1993 |
| JP | 05138377 A | 6/1993 |
| JP | 10309516 A | 11/1998 |
| JP | 2000103607 A | 4/2000 |
| JP | 2001300755 A | 1/2001 |
| JP | 200168829 A | 3/2001 |
| JP | 361161781 A | 6/2003 |
| WO | 8301400 | 4/1983 |

OTHER PUBLICATIONS

Freiwald et al., "Laser Ablation of Contaminants from Concrete and Metals Surfaces," Dec. 1994, pp. 1-53, F2 Associates, Incorporated.

Inta, "Radiant Energy Based Cleaning and Coating Removal Technology Comparison," Aug. 8, 1994, pp. 1-14, Manufacturing Technology Special Advanced Studies.

Barone, Philip A. "Automated Laser Paint Stripping (ALPS)," Jun. 1, 1992, pp. AD92-206-1 through AD92-206-17, Society of Manufacturing Engineers.

"The Company The Technology," Apr. 1997, General Lasertronics Corporation.

"Lasertronics Corporate Overview," Apr. 1997, Lasertronics Engineering Excellence.

"Lasertronics Aircraft Paint Removal," Apr. 1997, Lasertronics Engineering Excellence.

"Lasertronics Radiation/Medical Decontamination," Apr. 1997, Lasertronics Engineering Excellence.

"Lasertronics Grafitti Abatement," Apr. 1997, Lasertronics Engineering Excellence.

"Lasertronics Lead-Based Paint Removal," Apr. 1997, Lasertronics Engineering Excellence.

Driscoll et al. "Handbook of Optics," Dec. 1978, pp. 13-6 through 13-10, McGraw-Hill Book Company.

Liu et al., "Paint Removal Using Lasers," Jul. 20, 1995, pp. 4409-4414, Applied Optics, vol. 34, No. 21.

Lovoi, Paul, "Laser Paint Stripping Offers Control and Flexibility," Nov. 1994, pp. 75-80, Laser Focus World.

Bonkowski et al., "CW Laser Paint Stripping," Aug. 1991, pp. 1-20, The Laser Institute and National Science and Engineering Research Council.

Lovou, Paul, "Laser/Robot Paint Stripping; Laser Ablation Coating Removal," Apr. 1988, International Technical Associates.

* cited by examiner

Fig. 6

COLOR SENSING FOR LASER DECOATING

RELATED APPLICATIONS

This Application is a divisional of U.S. patent application Ser. No. 11/030,710, filed on Jan. 5, 2005 now U.S. Pat. No. 7,633,033, and entitled "Color Sensing for Laser Decoating," which claims priority of U.S. provisional application, Ser. No. 60/535,725, filed Jan. 9, 2004, and entitled "Color Sensing for Laser Decoating," by the same inventors. The U.S. patent application Ser. No. 11/030,710, filed on Jan. 5, 2005, and entitled "Color Sensing for Laser Decoating," and the U.S. provisional application Ser. No. 60/535,725, filed Jan. 9, 2004, and entitled "Color Sensing for Laser Decoating" are hereby incorporated by reference.

FIELD OF THE INVENTION

The invention relates to ablating a coating using a laser. In particular, the invention relates to removing a coating from a surface using a laser and color sensing system.

BACKGROUND OF THE INVENTION

Delivery of certain wavelengths of radiant energy is facilitated by transmission along flexible silica fibers. The energy is dispersed from the emitting end of an optical fiber in a widening cone. The energy intensity is generally symmetric about the central fiber axis (e.g., uniformly distributed in azimuth) at the emitting end. The distribution of emitted energy orthogonal to the azimuth angle is highly non-uniform, with highest intensity at the central axis, rapidly decreasing with increasing divergence angle relative to the central fiber axis, sometimes approximated by a power cosine function of the divergence angle.

Energy beam guiding structures are known that use refractive media (e.g. optical lenses) in combination with movable reflective media (e.g. mirrors) to focus and direct diverging radiant energy disposed around the input beam axis to a target of interest. The optical lenses typically convert (collimate) the dispersing radiant energy to a second beam with the radiant energy directed more parallel to the input beam axis. The second beam's energy is distributed over a cross-sectional area defined on a target surface oriented in a transverse plane intersecting the optical axis of the second beam. The size of the defined area is typically limited by the diameter of the lenses. The movable reflective media are coupled to transporting mechanisms and are positioned to modify the direction of the collimated beam as a function of time, typically in a raster pattern scan mode. The dynamic positioning of the reflective media is generally arranged so that the energy of the second beam, averaged over a multiple number of scan cycles, is distributed as a less intense, more uniform energy intensity distribution over the desired target surface area. In addition, one or more condensing (focusing) lens can be used to focus the collimated beam energy to a fine point at the target's surface. Combinations of mirrors and lenses are used to achieve both effects. The typical objective of these combined reflective and refractive elements is to modify the beams intensity distribution over the width of a limited transverse area and to move the scan area over a target surface to produce a less intense, more uniform, energy intensity distribution over a larger area.

In previous laser scanning heads, the beam is typically reflected from two raster scanning mirrors movably mounted in a housing where they are disposed with the first mirror intercepting the input beam, reflecting it to the second mirror, which then reflects the beam toward the target.

Laser-based coating removal systems use pulses of light from high power lasers to ablate or vaporize the paint or other coating from a surface. Each pulse removes the coating from a small region, typically 0.1 to 100 square mm. The laser is pointed to a different area after each pulse, where the removal process is repeated until the entire surface is cleaned.

An advantage of lasers for coating removal is that each laser pulse removes a predictable portion of the thickness of the coating, in the small region impacted by the pulse. This opens the possibility of selective stripping where, for example, the topcoat could be removed but not the primer.

There have been previous designs using color as a selection criterion for selective stripping, such as U.S. Pat. Nos. 5,643,476, and 6,288,362, as well as U.S. patent application Ser. No. 10/272,329. These conventional processes utilize a television camera to observe the field being stripped and a computer to analyze the image. The drawback of this approach is the difficulty in maintaining the correspondence between the TV field of view and that of the laser scanner. Any curvature or movement of the surface causes a mismatch between the camera and laser scanning coordinates. This results in a failure to strip desired locations as well as stripping undesired locations.

SUMMARY OF THE INVENTION

Embodiments of the present invention are directed to a coating removal apparatus for and a method of removing a coating from a surface. Laser scanning optics preferably also function as the sensing path for a color sensor to achieve a known correspondence between the scanning optics conditions and the local surface color parameters.

The positions of focusing and scanning optics determine a laser light path to a target location on the coated surface. Immediately prior to firing the laser light pulse onto the target position, illumination is provided to the target position on the surface by one or more illuminators. The illumination is reflected and collected by the scanning and focusing optics. The reflected light is separated from the laser path at some location and sent to a photosensitive detector. A beam splitter is preferably used to re-direct the reflected light from the laser path to the photosensitive detector. The detected illumination signal is then compared with the specifications and this signal is used to determine whether to fire the laser at this particular target location.

There are several variations possible for implementing this design. In one configuration, the scanning optics include mirrors, also known as reflecting scanners. In another configuration, the scanning optics include refracting scanners where the light is deflected by transmissive optics. Other variations are directed to the illumination that provides the reflected light. Preferably, the illumination is provided at the surface. Alternatively, the illumination is provided through the focusing and scanning optics. It is also possible to provide the illumination through the focusing and scanning optics and have the detector collecting the light directly from the surface.

Preferably, the laser source is coupled to the focusing optics. Alternatively, the laser source is coupled to the focusing and scanning optics via a fiber optic cable. In this alternative configuration, the photosensitive detector and beam splitter, as well as the illuminator, are located at the laser end of the fiber optic cable.

The illumination and detection process can be accomplished in several manners. It can vary from the simplicity of a single sensor and illumination at either a single or wide range of wavelengths. In such a configuration, the single detector with a wide spectrum illuminator constitutes a grayscale sensor measuring only the relative lightness of the surface. At the more complex end of the scale, a spectrophotometer sensor measures the reflectance at hundreds of different wavelengths. In the preferred embodiment, two colors, red and blue, are used for measurement.

The colors can be separated in various ways. One approach uses filters to separate the colors, where each separated color is sent to a corresponding detector. Another technique is to separate the colors using a grating. In the preferred embodiment, a single detector is used and the colors are separated temporally. Using this preferred approach, the red illuminator is energized and the red measurement made, then the blue illuminator is energized and the blue measurement made through the same detector. Alternatively, the blue illuminator is energized and the blue measurement made, then the red illuminator is energized and the red measurement made.

BRIEF DESCRIPTION OF THE DRAWINGS

FIG. 6 illustrates an exemplary coating removal pattern.

Within the figures, similar elements maintain the same reference numerals.

DETAILED DESCRIPTION OF THE PRESENT INVENTION

Figure 1:
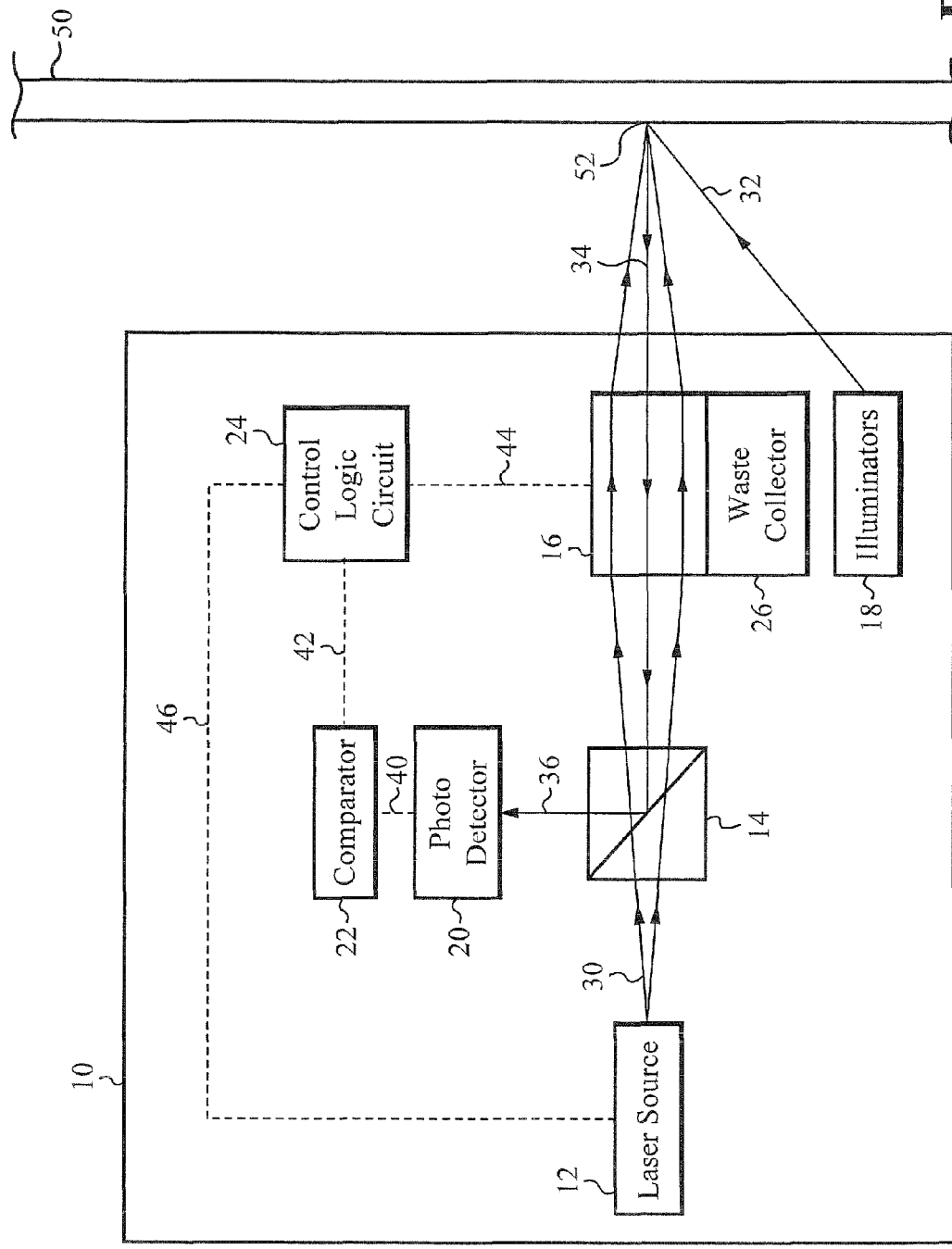
FIG. 1 illustrates a block diagram of a coating removal device according to an embodiment of the present invention.

Embodiments of the present invention are directed to an apparatus for and a method of utilizing a common optics path to provide laser pulses to a coated surface and to direct a light illumination reflected from the coated surface to a photosensitive detector and analyzer. Preferably, the apparatus is an integrated device including a laser source, a beam splitter, scanning optics, a waste removal apparatus, one or more light illuminators, a photosensitive detector, a comparator, and a control logic circuit. Alternatively, the laser source is external to the integrated device and a fiber optic cable is used to connect the laser source to the integrated device.

The focusing and scanning optics are positioned such that a laser light path is directed to a first position on the coated surface. Immediately prior to firing a laser light pulse on the first position of the coated surface, illuminators provide illumination which is preferably directed to the first position of the coated surface. The illumination is reflected and collected by the focusing and scanning optics and is separated from the laser path at some location by the beam splitter. The separated reflected light is directed to the photosensitive detector. The comparator compares the reflected light detected by the photosensitive detector to predefined specifications in order to determine whether or not to fire the laser at the first position on the coated surface.

The control logic circuit provides control signals to the laser source to generate each laser pulse. The control logic circuit also provides control signals to the scaling optics such that the scanning optics are properly aligned to direct the laser pulse to a determined position on the coated surface. After the laser pulse impinges the coated surface, the control logic circuit sends control signals to the scanning optics to realign themselves such that a subsequent laser pulse is directed to a second position on the coated surface. After the scanning optics are realigned, the control logic circuit sends a control signal to the laser source to generate the subsequent laser pulse, which is directed to the second position on the coated surface. Procession over the coated surface continues according to a predetermined coating removal pattern. At each position within the pattern, reflected light is collected and analyzed. At each position, preferably a comparator determines if a sufficient amount of coating has not yet been removed. If it is determined that a sufficient amount of coating has not yet been removed, then a laser pulse is preferably fired at that position and then a determination is made of the next position. If it is determined that a sufficient amount of coating has been removed from the position, then the laser pulse is not fired and a determination is made for the next position. This process is repeated for an area until a predetermined percentage of the positions within the area do not require the laser to fire. In this case, the system then moves to the next area. Alternatively, a determination memory is utilized such that if the comparator determines that a sufficient amount of coating has not yet been removed from a position on the coated surface, then the control logic circuit adds the position to a records list such that during a subsequent cycle performed according to the coating removal pattern, a laser pulse is preferably fired oily at the positions listed in the records list.

Ablation of the coating causes a waste byproduct. The waste removal apparatus preferably collects the waste byproduct from the ablated surface and directs the collected waste to an externally coupled waste receptacle. Alternatively, the waste removal apparatus includes local storage for the collected waste byproduct.

FIG. 1 illustrates a block diagram of a coating removal device according to an embodiment of the present invention. The coating removal device 10 is an integrated device that includes a laser source 12, a beam splitter 14, scanning optics 16, illuminators 18, a photosensitive detector 20, a comparator 22, a control logic circuit 24, and a waste collector 26. Within FIG. 1, the solid lines between elements represent optical paths and the dashed lines represent data signal paths. The laser source 12 generates a laser pulse, represented as light 30. Light 30 passes through the beam splitter 14 to the scanning optics 16. Within the scanning optics 16, the light 30 is aligned and focused such that the light 30 impinges a specific position 52 on a coated surface 50. A laser scanning path is defined as the path the laser pulse traverses to reach the coated surface 50. In reference to FIG. 1, the laser scanning path includes the path through the beam splitter 14 and the scanning optics 16.

As is well known in the art of laser optics, a surface area of the position 52 onto which the light 30 impinges can be made as small or as large as necessary to perform the desired functionality of ablating the coating at the position 52. Increasing or decreasing the impinging surface area respectively decreases or increases the light intensity delivered onto the surface area. The amount of light intensity is an adjustable parameter which is used to meet various application specifications. It is understood that the light intensity delivered over a given surface area depends not only on the given surface area but also in part to the laser source specifications and loss within the integrated apparatus.

Upon impinging the position 52, the light 30 ablates a portion of the coating corresponding to the position 52. It is anticipated that each laser pulse removes a uniform amount of coating. The amount of coating removed includes the surface area impinged by the light 30 and a depth of the coating at the position 52. An anticipated depth can be calculated based on the intensity of the light 30, the surface area impinged, the nature of the coating, etc. In operation, the actual depth of the coating that is removed can vary from the calculated depth. Underneath the coating to be removed is either a different coating (an undercoating) comprising a different material or a different color, or the original surface material to which the coating was originally applied. In either case, it is anticipated that the undercoating or original surface reflects a wavelength of light different than that reflected by the coating being removed. As such, it can be determined if the coating to be removed is in fact completely removed by measuring a wavelength of light reflected off the position 52. The illuminators 18 provide a light illumination 32 to the position 52 on the coated surface 50. Light illumination 32 is reflected off the position 52 as reflected light 34 and through the scanning optics 16 to the beam splitter 14. At the beam splitter 14, the reflected light 34 is split, or re-directed, from the laser scanning path as re-directed reflected light 36. The light 36 is directed to the photosensitive detector 20 where characteristics of the reflected light are measured. Data corresponding to the measured characteristics is sent from the photosensitive detector 20 to the comparator 22 via a data line 40.

A color sensing path is defined as the path the reflected light traverses from the coated surface 50 to the photosensitive sensor 20. In reference to FIG. 17 the color sensing path includes the path through the scanning optics 16 and the beam splitter 14. Within the preferred embodiment, the color sensing path includes the optics that comprises the laser scanning path.

The comparator 22 compares the measured characteristics of the reflected light to previously defined parameters and thresholds. The previously defined parameters and thresholds call be internally stored within the comparator 22, or they can be received from a separate memory for the purposes of being used in the comparison operation. The memory is preferably a conventional memory type located within the integrated device 10. Included within the previously defined parameters are characteristics of the coating to be removed, for example the coating color.

The results of the comparison made by the comparator 22 are sent to the control logic circuit 24 via a data line 42. The comparison determines if the coating is sufficiently removed from the position 52. To make this determination, the wavelength of the reflected light is measured. The reflected light wavelength indicates a color of a top layer of the coated surface 50 at the position 52 after the portion of coating has been ablated by the impinging light 30. If this measured top layer color is substantially the same as a color of the coating to be removed, as defined by the stored coating parameters, then it is determined that a portion of the coating to be removed still remains at the position 52. In this case, the laser pulse is then fired at this position and the system then moves to the next position. This process is repeated for an area until a predetermined percentage of the positions within the area do not require the laser to fire. In this case, the system then moves to the next area.

If the comparison performed by the comparator 22 determines that the top layer color is substantially different than the previously defined coating color, then it is concluded that directing another laser pulse onto the position 52 is not necessary. After the laser pulse impinges the position 52, or it is determined that firing the laser pulse at the position is not necessary, the control logic circuit 24 sends a control signal to the scanning optics 16 via a data line 44, the control signal instructs the scanning optics 16 to realign such that a subsequent laser pulse is directed to a position on the coated surface 50 different than the position 52. After the scanning optics 16 are realigned to a subsequent position, a determination is then made as to whether or not the laser pulse should be fired at the new position.

In one embodiment, as the scanning optics 16 are realigned, a delay in the color sensing circuit causes an offset between the color sensing location, such as position 52, and the subsequent firing location. If this error is too large, performance may be inadequate. A solution to this problem is to offset the position of the color sensing relative to the stripping position, to provide a look ahead function. Considerations are made for situations where the scanning direction or speed is changed. In these situations, the color sensor is moved to change the offset or multiple sensors are used for different scan speeds and directions.

Although not shown in the figures, individual optical elements within the scanning optics 16 are aligned using any conventional means for physically moving one or more of the individual optical elements. For example, drive gears are connected to the optical elements and a motor is connected to the drive gears. In this example, control signals sent by the control logic circuit 24 provide instructions as to the movement of the drive gears using the motor.

Figure 2:
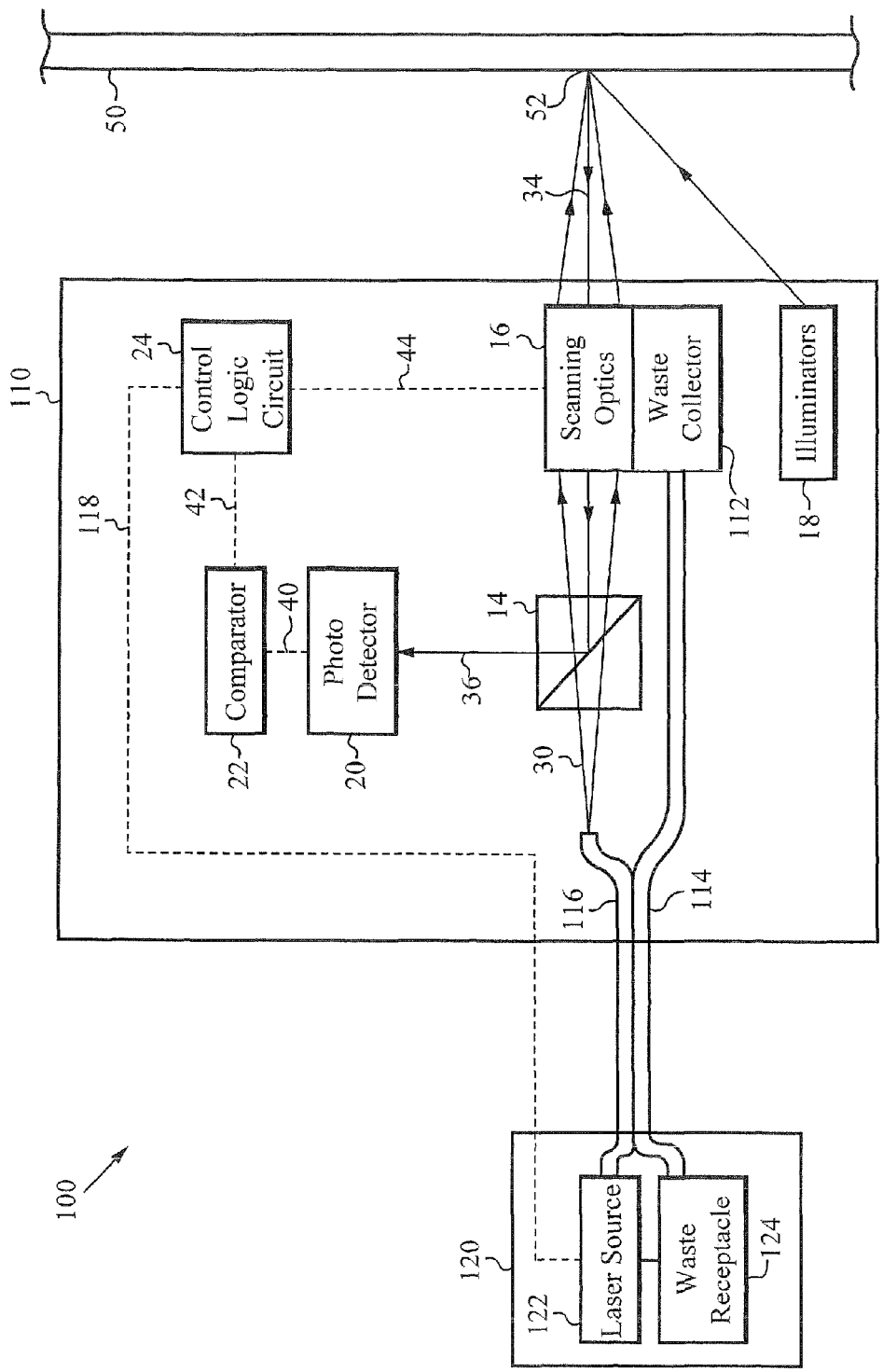
FIG. 2 illustrates a block diagram of a coating removal device according to another embodiment of the present invention.

The waste collector 26 collects the waste byproduct resulting from the laser pulse impinging the coated surface 50 and ablating the top layer coating. The waste collector 26 includes a local storage for storing the collected ablated waste byproduct. An alternative waste collector acts as a waste removal apparatus and is coupled to an external waste receptacle such that the collected waste byproduct is transported to the external waste receptacle, as shown in FIG. 2. Operation of the waste collector is described in more detail below.

FIG. 2 illustrates a coating removal device 100 according to another embodiment of the present invention. The coating removal device 100 includes a head component 110 and a body component 120. The body component 120 includes a laser source 122 and a waste receptacle 124. A fiber optic cable 116, a waste transport tube 114, and a data line 118 couple the body component 120 to the head component 110. The fiber optic cable 116, the waste transport tube 114, and the data line 118 are all preferably bundled together as a single link. The body component 120 also preferably provides power to the head component 110 via a power line (not shown). The power line is also preferably included within the bundled link between the body component 120 and the head component 110. Alternatively, the head component 110 includes a power source (not shown) that is independent of the power source of the body component 120.

The head component 110 includes the beam splitter 14, the scanning optics 16, the illuminators 18, the photosensitive detector 20, the comparator 22, and the control logic circuit 24 which operate the same as described above in relation to FIG. 1. The fiber optic cable 116 provides the light 30 (laser pulse) from the laser source 122. The control logic circuit 24 provides control signals to the laser source 122 via the data line 118, in a manner similar to that described above in which the control logic circuit 24 provides control signals to the laser source 12 (FIG. 1) via data line 46 (FIG. 1).

Illumination, as provided by the illuminators 18, and detection of the resulting reflected light, as performed by the photosensitive detector 20, can be accomplished in several different manners. The illuminators can be comprised of one to many individual illuminators that provide illumination from a single wavelength to a wide range of wavelengths. Similarly, the photosensitive detector 20 can comprise one to many sensors for detecting light. One method using a single sensor with a wide spectrum illuminator, constitutes a grayscale sensor that measures the relative lightness of a surface. Another method uses a spectrophotometer sensor that measures a reflectance at hundreds of different wavelengths. In the preferred embodiment, two color illumination and sensing is implemented where the two colors are red and blue. The preferred configuration of the illuminators 18 includes two red illuminators and two blue illuminators. Alternatively, more or less red and blue illuminators can be used. It is contemplated that any illumination and sensing techniques can be used that enables the coating removal system to determine the color of a top layer of a coated surface.

The illumination colors can be separated using any conventional technique. One approach uses filters within the photosensitive detector such that the filters separate the colors and send each separated color to a corresponding sensor. Another approach is to separate the colors using a grating. In the preferred embodiment, color separation is performed using a single sensor within the photosensitive detector 20 and separating the colors temporally. To accomplish this, the red illuminators are energized and the corresponding reflected light is measured by the sensor in the photosensitive detector 20. Then, the blue illuminators are energized and the corresponding reflected light is measured by the same sensor. The order can be reversed such that the blue light is measured prior to the red light.

Referring again to FIG. 2, the head component 110 also includes a waste collector 112, which is coupled to the waste transport tube 114. The waste collector 112 collects the waste byproduct resulting from a laser pulse impinging the coated surface 50. The collected waste byproduct is transported through the waste transport tube 114 to the waste receptacle 124. The waste collector 112 and the waste collector 26 (FIG. 1) are preferably of the type described in the co-owned, co-pending U.S. patent application Ser. No. 10/272,329, filed on Oct. 15, 2002, and entitled "Laser Scanning Head with Rotary Scanning Coaxial Refractive Optics," which is hereby incorporated by reference.

In the preferred embodiment, impact of the focused laser beam on the target surface ejects ablation products in a direction generally counter to the direction of the incident beam. This waste byproduct enters the head component 110 at an exit aperture of a nosepiece (not shown) and preferably mixes internally with a purge-gas stream. The nosepiece is preferably shaped internally to redirect the purge stream after it picks up the waste byproducts. The exiting waste stream is directed rearward in the nosepiece to a passageway within the housing. The passageway delivers the purge flow to the waste transport tube 114 for transport to the waste receptacle 124 in the body component 120. A vacuum blower (not shown) in the body component 120 draws the purge flow through the service hose.

A converging nozzle internal to the nosepiece is mounted facing adjacent to the exit aperture. The exhaust stream draws a protective high-speed airflow through the nozzle toward the exit aperture to prevent the gases and particles from the target spot from reaching and contaminating the scanner optics and drive gears used to move the scanning optics.

The purge gas is preferably supplied through a tubular inlet on the side housing of the head component 110. A hose connected to a remote equipment unit supplies non-combustible gases, or, if allowed in the work area, the inlet is open to ambient air.

A more detailed description of the preferred waste collector 26, 112 is described in the previously referenced U.S. patent application Ser. No. 10/272,329.

Figure 3:
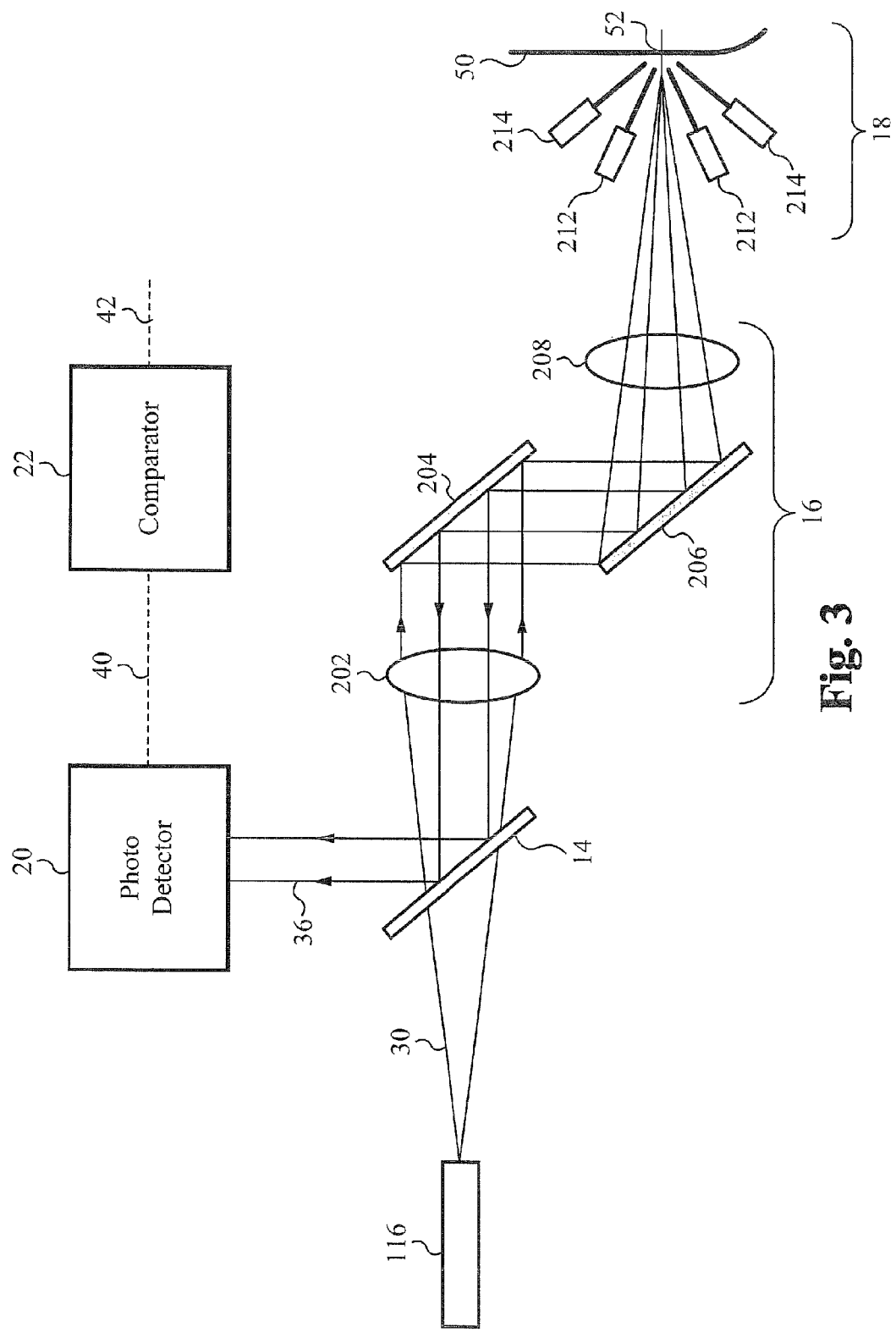
FIG. 3 illustrates a coating removal system including a first configuration of the scanning optics.
Figure 4:
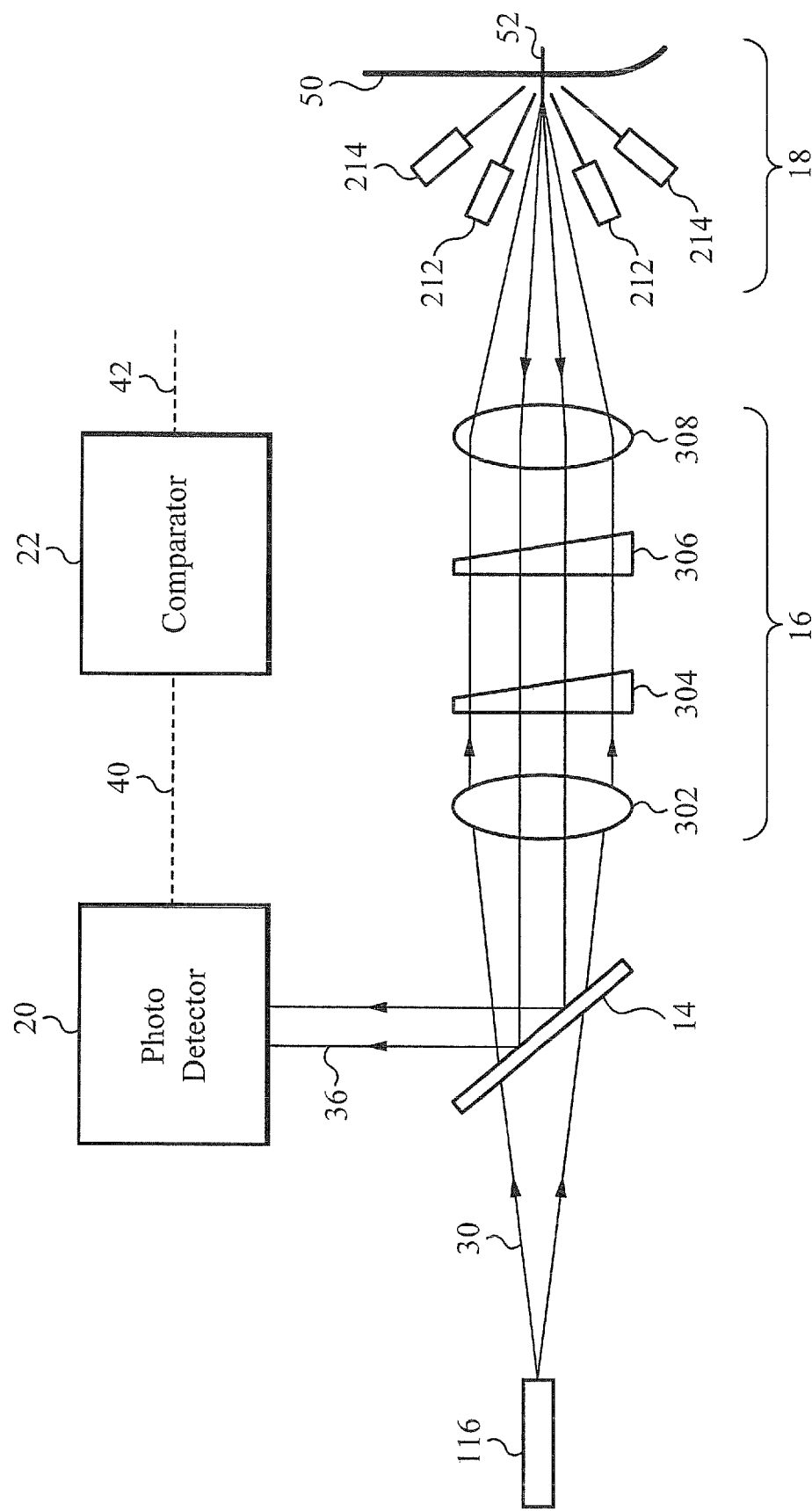
FIG. 4 illustrates a coating removal system including a second configuration of the scanning optics.

Numerous different optical configurations can be used within the scanning optics 16 (FIGS. 1 and 2) to direct the light 30 to the coated surface 50 and to direct the reflected light 34 from the coated surface 50 the beam splitter 14. One such configuration, as shown in FIG. 3, includes the use of focusing optics and reflecting scanners, for example mirrors. Another configuration, as shown in FIG. 4, utilizes focusing optics and refracting scanners, such as prisms. It is understood that the scanning optics 16 have the ability to be optically configured in any number of different configurations, using any number of optical elements, such that the scanning optics 16 direct a laser light pulse from a first optical position (such as the beam splitter 14) to the coated surface and direct a reflected light from the coated surface back to the first optical position.

FIG. 3 illustrates a coating removal system including a first configuration of the scanning optics. The scanning optics 16 (FIGS. 1 and 2) include focusing optics 202 and 208, and reflecting scanners 204 and 206. The first configuration of the scanning optics 16 is shown in FIG. 3 as being applied to the coating removal system 100 (FIG. 2). The first configuration can be equally applied to the coating removal system 10 (FIG. 1). For simplicity, not all elements of the coating removal system 100 are shown in FIG. 3.

The focusing optics 202 collimate the light 30 and direct the collimated light to the reflecting scanner 204. The light 30 is reflected by the reflecting scanners 204 and 206 to the focusing optics 208. The focusing optics 208 direct and focus the light 30 to a position, such as position 52, on the coated surface 50. The exact position on the coated surface 50, and the dimensions of the light impinging the coated surface 50, are determined by the alignments of the focusing optics 202, the reflecting scanners 204 and 206, and the scanning optics 208, which are controlled by control signals sent by the control logic circuit 24. Although the focusing optics 202 and 208 are shown in FIG. 3 as single elements, it should be clear to those skilled in the art that either or both of the focusing optics 202 and 208 can comprise one or more optical elements. Similarly, although two reflecting scanners 204 and 206 are shown in FIG. 3, it should be clear that more, or less than two reflecting scanners can be used.

FIG. 3 also illustrates a first configuration of the illuminators 18. In this first configuration, the light illuminators 18 include two red illuminators 212 and two blue illuminators 214.

FIG. 4 illustrates a coating removal system including a second configuration of the scanning optics. The coating removal system shown in FIG. 4 is the same as the coating removal system of FIG. 3 except that the focusing optics 202, reflecting scanners 204 and 206, and focusing optics 208 of FIG. 3 are replaced by focusing optics 302, refracting scanners 304 and 306, and focusing optics 308. The focusing optics 302 collimate the light 30 and direct the collimated light to the refracting scanner 304. The light 30 is refracted by the refracting scanners 304 and 306 to the focusing optics 308. The focusing optics 308 direct and focus the light 30 to a position, such as position 52, on the coated surface 50. The exact position on the coated surface 50, and the dimensions of the light impinging the coated surface 50, are determined by the alignments of the focusing optics 302, the refracting scanners 304 and 306, and the scanning optics 308, which are controlled by control signals sent by the control logic circuit 24. Preferred operation of the focusing optics 302 and 308, and the refracting optics 304 and 306 is described in the previously referenced U.S. patent application Ser. No. 10/272,329. Although the focusing optics 302 and 308 are shown in FIG. 4 as single elements, it should be clear to those skilled in the art that either or both of the focusing optics 302 and 308 can comprise one or more optical elements. Similarly, although two refracting scanners 304 and 306 are shown in FIG. 4, it should be clear that more, or less, than two reflecting scanners can be used.

Figure 5:
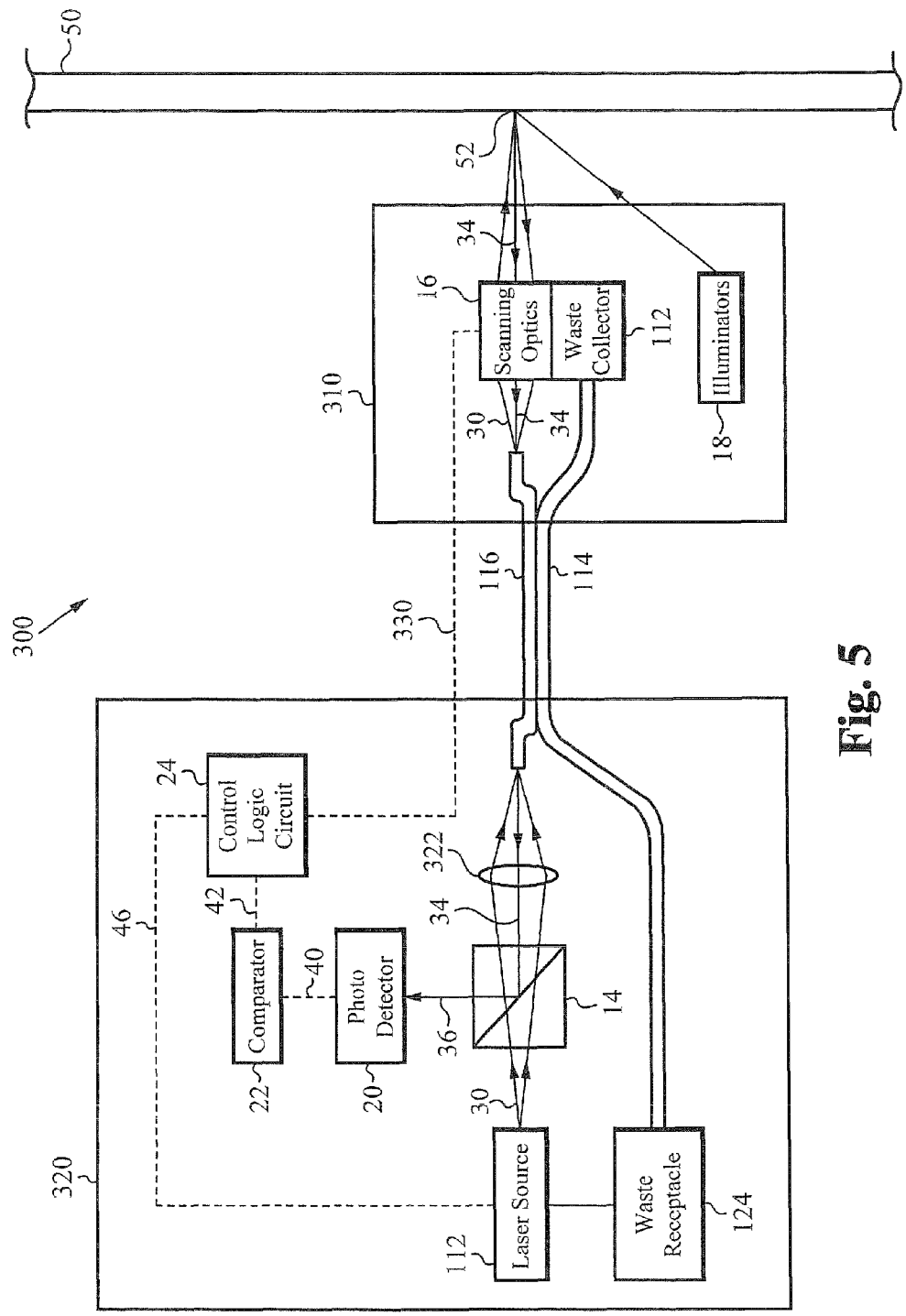
FIG. 5 illustrates a block diagram of a coating removal device according to yet another embodiment of the present invention.

FIG. 5 illustrates all alternative configuration of a coating removal device 300. In this alternative configuration, the beam splitter 14, the photosensitive detector 20, the comparator 22, and the control logic circuit 24 are located in a body component 320 (instead of in the head component as in the head component 110 of coating removal device 100 of FIG. 2). The coating removal device 300 operates in a similar manner as the coating removal device 100 (FIG. 2) except that reflected light 34 is directed to the body component for detection and analysis. The control logic circuit 24, located in the body component 320 of FIG. 5, sends control signals to the scanning optics 16 in the head component 310 via data line 330. Focusing optics 322 are included in the body component 320 to focus the light 30 into a first end of the fiber optic cable 116. The focusing optics 322 also direct the reflected light 34 received from the fiber optic cable 116 to the beam splitter 14.

In a manner similar to that of coating removal device 300, it is contemplated that the coating removal device 10 (FIG. 1) can be adapted such that the laser source 12 and the beam splitter 14 are optically coupled to the scanning optics 16 via a fiber optic cable. In such a configuration, the photosensitive detector 20 can be positioned at the laser source end of the fiber optic cable.

In operation, a coating removal device directs a laser pulse to a predetermined position on a coated surface. The laser pulse is directed to the predetermined position according to a laser path which includes a beam splitter, focusing optics, and scanning optics. The laser pulse, upon impinging the predetermined position, ablates some or all of the coating at the predetermined position. To determine if a proper amount of coating is removed from the predetermined position, light illuminators provide light illumination to the predetermined position. Reflected light resulting from the light illumination is directed along a color sensing path to a photosensitive detector. The color sensing path preferably includes some or all of the optical components of the laser path. The beam splitter re-directs the reflected light from the laser path to the photosensitive detector where measurements are taken. These measurements are sent from the photosensitive detector to a comparator where an analysis is made that compares characteristics of the detected light to predefined parameters and thresholds.

In the preferred embodiment, a color of the reflected light is measured and compared to a known color of the coating that is to be removed. If the comparator determines that the detected light is of the same color as the known color, then it is concluded that coating still remains at the predetermined position on the coated surface. In this case, the laser pulse is fired at the predetermined position. If the comparator determines that the detected light is not the same color as the known color, then it is concluded that coating no longer remains at the predetermined position on the coated surface, and as such, the laser pulse does not need to be fired at the position. In either case, the control logic circuit instructs the focusing and scanning optics to realign to a next position on the coated surface.

Coating that is ablated by an impinging laser pulse is collected as waste byproduct by a waste removal mechanism. The waste removal mechanism is preferably integrated within a common head assembly that includes the laser and color sensing optical paths.

As described in detail above, each laser pulse generated by the laser source is directed to a predetermined position on the coated surface. After the coating is removed from a first position, the control logic circuit instructs the focusing and scanning optics to align themselves such that a subsequent laser pulse is directed to a second position different than the first position. In most applications, the coating is removed from the entire coated surface. That is, if the coated surface comprises a 10 feet by 10 feet surface area, then the coated surface is removed over the entire 100 square feet. In this case, it is most efficient to remove coating from progressively adjacent positions. In other words, where the second position is located adjacent to the first position. However, this is not always the case. In some applications, it is not desired that the entire surface area is to be removed of coating. Instead, only portions of the surface area are to have the coating removed. The exact pattern of the coating to be removed can be any desired pattern. The control logic circuit preferably orchestrates the desired pattern according to a stored algorithm or program.

Figure 6:
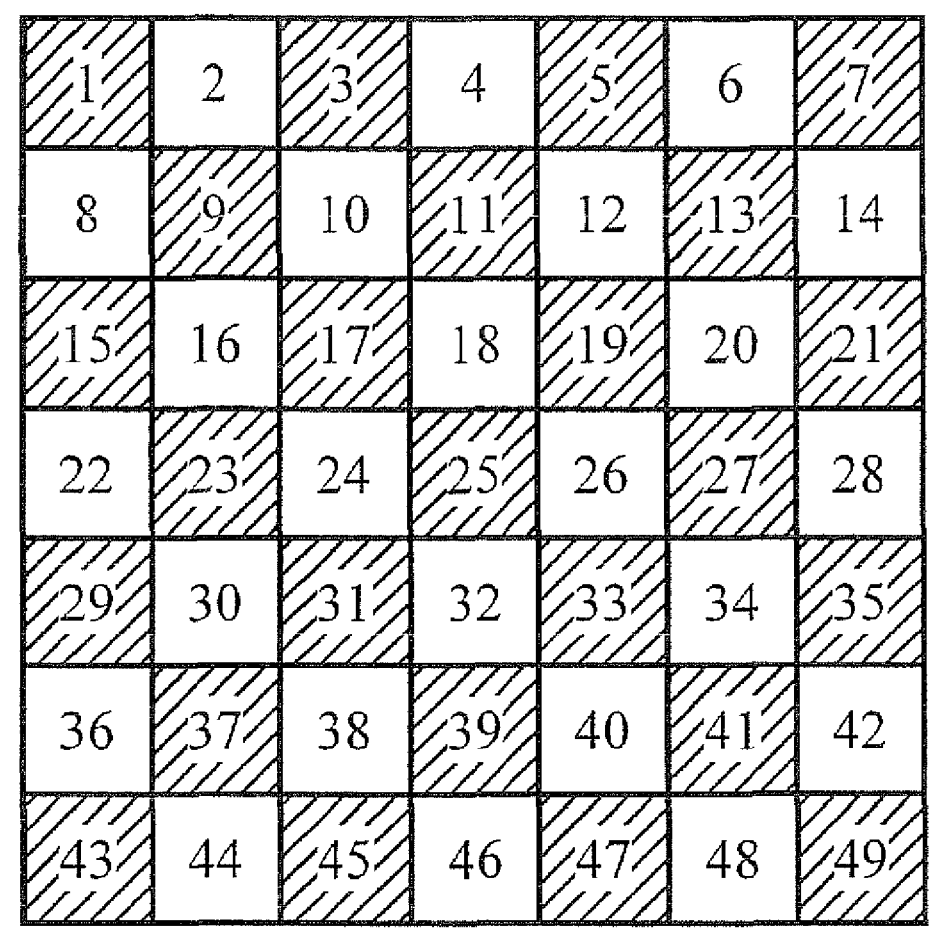

FIG. 6 illustrates an exemplary coating removal pattern. The larger box represents a coated surface with a surface area of 7 units by 7 units. The shadowed boxes, which are the odd numbered boxes, represent those positions on the coated surface at which the coating is to be removed. The clear boxes, which are the even numbered boxes, represent those positions on the coated surface at which the coating is not to be removed. If the coating removal system starts removing coating at the box 1, then after the coating is removed, the next position to which the focusing and scanning optics will align is one of the odd numbered boxes. In most circumstances, the next position would be either box 3, 9, or 15, although the exact sequence, as well as the starting position can vary. In this manner, the coated surface can be "roughed up", where only certain positions on the coated surface have the coating removed.

FIGS. 1-5 each show illumination provided directly at the coated surface 50 by the illuminators 18. It is also contemplated within the present invention that the illuminators can be positioned such that the illumination provided by the illuminators 18 is directed through the scanning optics 16. It is also contemplated that the illumination provided through the scanning optics 16 can be detecting by a photosensitive detector collecting reflected light directly from the coated surface 50.

Although the scanning optics 16 are described according to the first configuration including focusing optics and reflecting scanners, and according to the second configuration including focusing optics and refracting scanners, it is also contemplated that the scanning optics 16 can comprise any combination of focusing optics, reflecting scanners, and refracting scanners. It is also contemplated that although FIGS. 3 and 4 each show two different sets of focusing optics, 202/208 and 302/308, each of the two sets can be replaced by a single set of focusing optics.

In certain circumstances, sensing of the reflected light can be facilitated by providing a color sensing path that is different from the laser path. In this case, an alternative coating removal device is configured in which separate optical paths are configured, one for the laser path and one for the color sensing path.

Although not shown in FIGS. 1-5, any number of optical elements, such as lens and/or mirrors, can be used to direct the re-directed reflected light from the beam splitter to the photosensitive detector.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of removing a coating from a surface, the method comprising:
   a. providing a laser pulse;
   b. directing the laser pulse along a laser path to a first position on the surface, whereby the laser pulse impinges the first position on the surface thereby ablating a portion of the coating from the first position;
   c. providing a light illumination along a light illumination path, wherein the light illumination impinges the first position on the surface;
   d. directing a reflected light along a color sensing path, the reflected light resulting from the light illumination impinging the surface, wherein the color sensing path includes at least a portion of the laser path and the entire color sensing path is independent of the entire light illumination path;
   e. receiving the reflecting light at a photosensitive detector; and
   f. analyzing the received reflected light.

2. The method of claim 1 further comprising comparing the analyzed reflected light with predetermined parameters to determine if the coating is removed from the first position on the surface.

3. The method of claim 2 further comprising providing and directing a subsequent laser pulse to a second position on the surface.

4. The method of claim 3 further comprising determining the first position, the second position, and each successive position on the surface according to a coating removal pattern.

5. The method of claim 4 wherein if it is determined that the coating is not removed from the first position, then the method further comprises maintaining a record list of each position at which the coating is not removed, performing a subsequent coating removal cycle according to the coating removal pattern, and during the subsequent coating removal cycle providing and directing an additional laser pulse to each position listed on the record list.

6. The method of claim 1 wherein directing the laser pulse along the first laser path includes reflecting the laser pulse.

7. The method of claim 1 wherein directing the laser pulse along the first laser path includes refracting the laser pulse.

8. The method of claim 1 wherein the light illumination is provided directly to the surface.

9. The method of claim 1 wherein providing the light illumination directed at the first position on the surface comprises providing a plurality of temporally distinct light illuminations.

10. The method of claim 9 wherein analyzing the received reflected light comprises temporally separating the reflected light.

11. The method of claim 1 further comprising collecting the ablated portion of the surface.

12. A method of removing a coating from a surface, the method comprising:
   a. providing a laser pulse;
   b. directing the laser pulse along a laser path to a current one of a plurality of positions on the surface thereby ablating a portion of the coating from the current position;
   c. providing a light illumination along a light illumination path, wherein the light illumination impinges the current position on the surface;
   d. directing a reflected light along a color sensing path, the reflected light resulting from the light illumination impinging the surface, wherein the color sensing path includes the color sensed at the current position and the entire the color sensing path is independent of the entire light illumination path;
   e. receiving the reflecting light at a photosensitive detector; and
   f. measuring the received reflected light.

13. The method of claim 12 further comprising comparing the analyzed reflected light with predetermined parameters to determine if the coating is removed from the current position on the surface.

14. The method of claim 13 further comprising providing and directing a subsequent laser pulse to a second position on the surface.

15. The method of claim 14 further comprising determining the current position, the second position, and each successive position on the surface according to a coating removal pattern.

16. The method of claim 15 wherein if it is determined that the coating is not removed from the current position, then the method further comprises maintaining a record list of each position at which the coating is not removed, performing a subsequent coating removal cycle according to the coating removal pattern, and during the subsequent coating removal cycle providing and directing an additional laser pulse to each position listed on the record list.

17. The method of claim 12 wherein directing the laser pulse along the first laser path includes reflecting the laser pulse.

18. The method of claim 12 wherein directing the laser pulse along the first laser path includes refracting the laser pulse.

19. The method of claim 12 wherein the light illumination is provided directly to the surface.

20. The method of claim 12 wherein providing the light illumination directed at the current position on the surface comprises providing a plurality of temporally distinct light illuminations.

21. The method of claim 20 wherein measuring the received reflected light comprises temporally separating the reflected light.

22. The method of claim 12 further comprising collecting the ablated portion of the surface.

* * * * *